US010073253B2

(12) United States Patent
Lee et al.

(10) Patent No.: US 10,073,253 B2
(45) Date of Patent: Sep. 11, 2018

(54) SYNCHRONOUS CAMERA LENS MODULE PHOTOGRAPHING ALL DIRECTIONS WITH SINGLE LENS

(76) Inventors: Chung Gu Lee, Deajeon (KR); Sun Gu Lee, Daejeon (KR)

( * ) Notice: Subject to any disclaimer, the term of this patent is extended or adjusted under 35 U.S.C. 154(b) by 633 days.

(21) Appl. No.: 15/022,814

(22) PCT Filed: Oct. 10, 2011

(86) PCT No.: PCT/KR2011/007469
§ 371 (c)(1),
(2), (4) Date: Mar. 17, 2016

(87) PCT Pub. No.: WO2013/051744
PCT Pub. Date: Apr. 11, 2013

(65) Prior Publication Data
US 2016/0274337 A1    Sep. 22, 2016

(30) Foreign Application Priority Data

Oct. 7, 2011 (KR) .......................... 10-2011-0102391

(51) Int. Cl.
| | |
|---|---|
| *G02B 13/06* | (2006.01) |
| *G02B 7/02* | (2006.01) |
| *G02B 17/08* | (2006.01) |
| *G03B 37/00* | (2006.01) |

(52) U.S. Cl.
CPC ............ *G02B 13/06* (2013.01); *G02B 7/021* (2013.01); *G02B 17/086* (2013.01); *G02B 17/0856* (2013.01); *G03B 37/00* (2013.01)

(58) Field of Classification Search
CPC ...... G02B 13/06; G02B 17/086; G02B 7/021; G02B 17/0856; G03B 37/00
See application file for complete search history.

(56) References Cited

FOREIGN PATENT DOCUMENTS

| | | | |
|---|---|---|---|
| JP | 11-316343 A | | 11/1999 |
| JP | 2009-145839 A | | 7/2009 |
| JP | 2010-008496 A | | 1/2010 |
| KR | 10-1051169 | * | 7/2011 ............. G02B 13/04 |
| KR | 10-1051169 B1 | | 7/2011 |

OTHER PUBLICATIONS

International Search Report dated Oct. 18, 2012 for PCT/KR2011/007469.

* cited by examiner

*Primary Examiner* — Joseph P Martinez
(74) *Attorney, Agent, or Firm* — STIP Law Group, LLC

(57) ABSTRACT

The present invention relates to a synchronous camera lens module photographing in all directions with a single lens, and more particularly, to a synchronous camera lens module which replaces only a lens module of a conventional monitoring camera by providing a synchronous camera lens module using a single optical lens capable of performing wide-angle photographing to photograph in all directions with the single lens which is high economically and in efficiency and can minimize a blind zone.

6 Claims, 7 Drawing Sheets

SYNCHRONOUS CAMERA LENS MODULE PHOTOGRAPHING ALL DIRECTIONS WITH SINGLE LENS

CROSS REFERENCE TO RELATED APPLICATION

This application claims the priority of Korean Patent Application No. 10-2011-0102391 filed on Oct. 7, 2011 in the Korean Patent and Trademark Office. Further, this application is the National Phase application of International Application No. PCT/KR2011/007469 filed on Oct. 10, 2011, which is incorporated herein by reference in its entirety.

TECHNICAL FIELD

The present invention relates to a synchronous camera lens module photographing all directions with a single lens, and more particularly, to a synchronous camera lens module, which replaces only a lens module of a conventional monitoring camera by providing a synchronous camera lens module using a single optical lens capable of performing wide-angle photographing to photograph in all directions with the single lens which is high economically and in efficiency and can minimize a blind zone.

BACKGROUND ART

Small monitoring cameras currently sold for a vehicle and for security have been developed by a technique that photographs a general subject without distortion.

As a camera used for a purpose of monitoring a crime scene and a risk element intellectualized day by day, a demand for a small camera which maximally removes a blind zone (an image of a part which is not shown) by maximizing a viewing angle rather than a general purpose of acquiring a general subject without distortion comes to the fore.

Conventional monitoring cameras cannot but be vulnerable to an angle which is not caught by a lens because image data only on one surface is processed by not a wide viewing angle but a short viewing angle and the image is acquired with respect to the blind zone which is not shown by installing multiple cameras in order to compensate for the problem.

Then, an increase in installation cost and an aesthetic problem depending on installation of multiple cameras cannot but be caused in order to remove the blind zone.

Further, most monitoring cameras are difficult to observe and monitor a wide area with one camera and a technology that implements a wide angle is not sufficient.

As a background, disclosed are a fish-eye lens and an image capturing apparatus as Japanese Patent Laid-open Publication No. 2009-145839 (Jul. 2, 2009) and this is a technology that suppresses occurrence of a division degree to correspond to achievement of the wide angle of 80° or higher.

PRIOR ART DOCUMENT (Patent Document) Japanese Patent Laid-open Publication No. 2009-145839 (Jul. 2, 2009)

DISCLOSURE

Technical Problem

Accordingly, the present invention is contrived to solve the conventional problem, and an object of the present invention is to increase economics and efficiency and minimize a blind zone by replacing only a lens module of a conventional monitoring camera by providing a synchronous camera lens module using a single optical lens capable of performing wide-angle photographing.

Technical Solution

In order to achieve the object to be solved by the present invention,
according to the present invention, a synchronous camera lens module photographing in all directions with a single lens is configured to include:
a refraction portion 120 formed to refract incident light;
a horizontal portion 130 formed horizontally to the end of the refraction portion;
a reflection coating 150 which is formed in the horizontal portion to reflect the incident light reflected from an inner reflection coating and provide the incident light to an inner concave;
an omnidirectional lens 100 configured to include the inner concave 210 refracting the incident light reflected through the reflection coating again to provide the incident light to a lens array, an inner refraction portion 220 formed on the end of the inner concave to be concave, and an inner reflection coating 230 which is formed in the inner refraction portion to reflect the incident light incident from the refraction portion to the reflection coating; and
a barrel 500 having the omnidirectional lens installed and configured in front thereof and having the lens array 300 therein.

Advantageous Effects

According to the present invention, a synchronous camera lens module photographing in all directions with a single lens increases economics and efficiency and minimizes a blind zone by replacing only a lens module of a conventional monitoring camera by providing a synchronous camera lens module using a single optical lens capable of performing wide-angle photographing.

Further, since the lens itself is not aspheric but spherical, processing the lens is easy and a manufacturing process is simple, thereby providing manufacturing convenience and manufacturing cost saving.

EXPLANATION OF REFERENCE NUMERALS AND SYMBOLS

Figure 1:
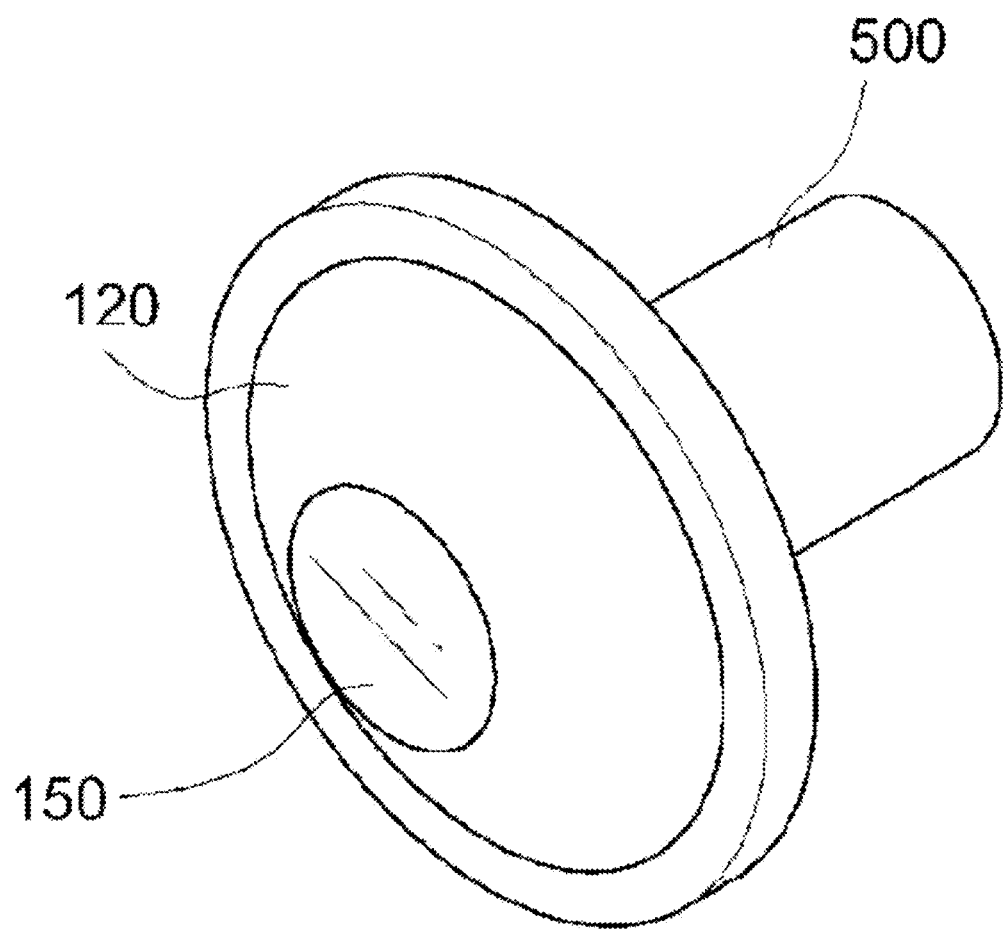
FIG. 1 is a perspective view of a spherical lens of a synchronous camera lens module photographing all directions with a single lens according to an embodiment of the present invention.

100: Omnidirectional lens
110: Central axis
120: Refraction portion
130: Horizontal portion
150: Reflection coating
210: Inner concave
220: Inner refraction portion
230: Inner reflection coating
300: Lens array
500: Barrel

BEST MODES

In order to achieve the object, according to an embodiment of the present invention, a synchronous camera lens module photographing all directions with a single lens includes
a refraction portion 120 formed to refract incident light;
a horizontal portion 130 formed horizontal to the end of the refraction portion;
a reflection coating 150 which is formed in the horizontal portion to reflect the incident light reflected from an inner reflection coating and provide the incident light to an inner concave;
an omnidirectional lens 100 configured to include the inner concave 210 refracting the incident light reflected through the reflection coating again to provide the incident light to a lens array, an inner refraction portion 220 formed on the end of the inner concave to be concave, and an inner reflection coating 230 which is formed in the inner refraction portion to reflect the incident light incident from the refraction portion to the reflection coating; and
a barrel 500 having the omnidirectional lens installed and configured in front thereof and having the lens array therein.

In this case, an inclination of the inner refraction portion is steeper than that of the refraction portion based on a virtual central axis 110.

In this case, the inner concave 210
is formed to take a focus.
In this case, the omnidirectional lens 100
is capable of securing a viewing angle of 360°.

Hereinafter, a preferred embodiment of a synchronous camera lens module photographing all directions with a single lens according to the present invention will be described in detail with reference to the accompanying drawings.

FIG. 1 is a perspective view of a spherical lens of a synchronous camera lens module photographing all directions with a single lens according to an embodiment of the present invention.

Figure 2:
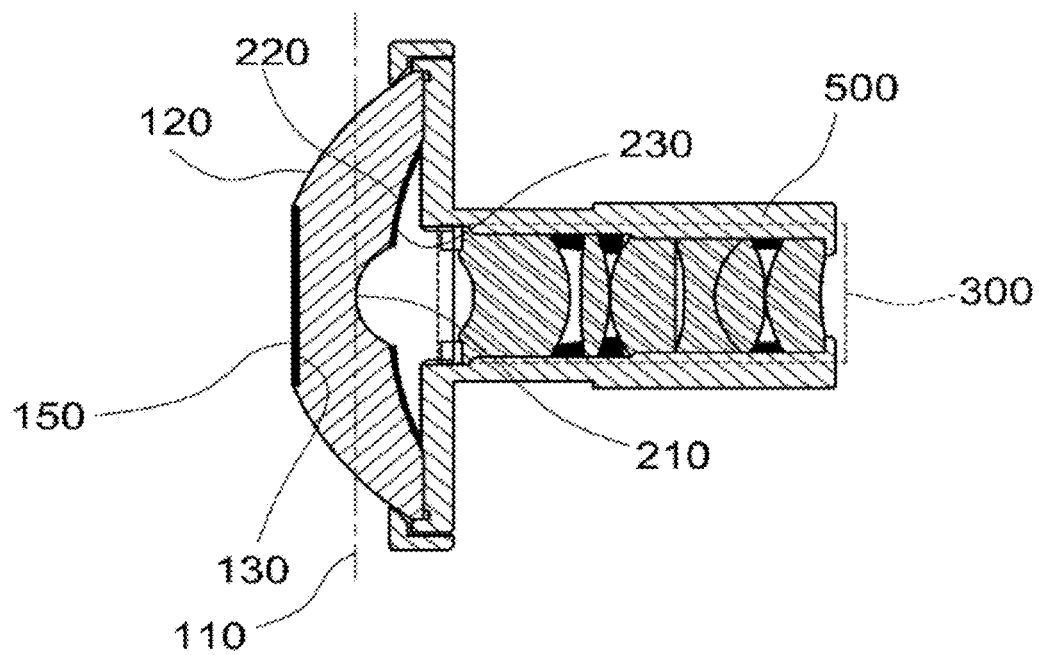
FIG. 2 is a cross-sectional view of the synchronous camera lens module photographing all directions with a single lens according to the embodiment of the present invention.

FIG. 2 is a cross-sectional view of the synchronous camera lens module photographing all directions with a single lens according to the embodiment of the present invention.

As illustrated in FIGS. 1 and 2, the synchronous camera lens module photographing all directions with a single lens according to the present invention includes
a refraction portion 120 formed to refract incident light;
a horizontal portion 130 formed horizontally to the end of the refraction portion;
a reflection coating 150 which is formed in the horizontal portion to reflect the incident light reflected from an inner reflection coating and provide the incident light to an inner concave;
the inner concave 210 refracting the incident light reflected through the reflection coating again to provide the incident light to a lens array;
an omnidirectional lens 100 configured to include an inner refraction portion 220 formed on the end of the inner concave to be concave and an inner reflection coating 230 which is formed in the inner refraction portion to reflect the incident light incident from the refraction portion to the reflection coating; and
a barrel 500 having the omnidirectional lens installed and configured in front thereof and having the lens array 300 therein.

There is an advantage in that a viewing angle of 360° may be secured through the omnidiretional lens configuration.

That is, the refraction portion 120 is formed to refract the incident light and the horizontal portion 130 is formed horizontally to the end of the refraction portion.

In this case, the reflection coating 150 is formed in the horizontal portion to reflect the incident light reflected from the inner reflection coating and provide the incident light to the inner concave.

Further, on an inner surface, the inner concave 210 is formed, which refracts the incident reflected to a center portion of the omnidirectional lens through the reflection coating again to provide the incident light to the lens array and the inner refraction portion 220 is formed on the end of the inner concave to be concave.

In this case, the inner reflection coating 230 is formed, which is formed in the inner refraction portion to reflect the incident light incident from the refraction portion to the reflection coating.

As described above, two refraction surfaces and two reflection coating surfaces are configured.

Further, since the omnidirectional lens itself is not aspheric but spherical, processing the lens is easy and a manufacturing process is simple, thereby providing manufacturing convenience and manufacturing cost saving.

That is, the refraction portion, and the inner refraction portion and the inner concave have spherical surfaces, and as a result, an omnidirectional photographing possible effect is provided while solving processing difficulty which is a problem when the omnidirectional lens is aspherical.

The omnidirectional lens is installed and configured in front of the barrel 500 and the lens array 300 is formed in the barrel.

Further, it is characterized in that an inclination of the inner refraction portion is steeper than that of the refraction portion based on a virtual central axis 110 of the omnidirectional lens.

An inclination angle of the inner refraction portion is formed to be larger than that of the refraction portion in order to satisfy a viewing range in the range of 35 to 85°.

Meanwhile, the reason for forming the inner concave 210 at the inner center portion of the omnidirectional lens is to take the focus.

Figure 3:
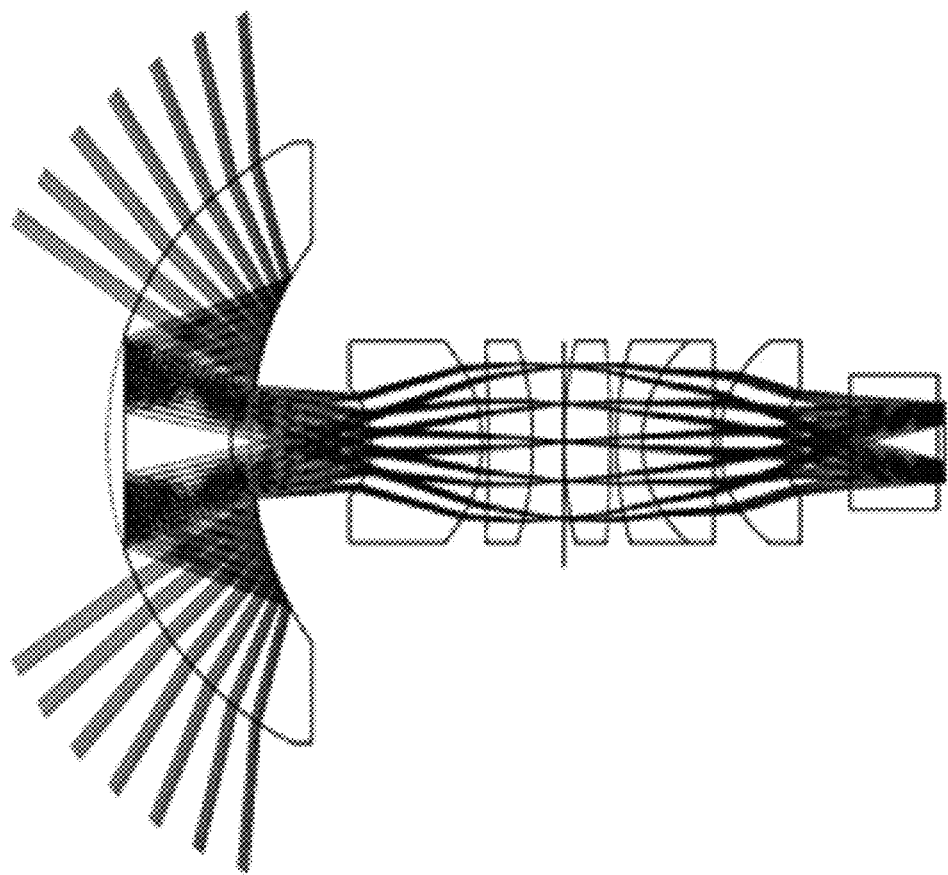
FIG. 3 is an image simulation diagram illustrating an image of the synchronous camera lens module photographing all directions with a single lens according to the embodiment of the present invention.

FIG. 3 is an image simulation diagram illustrating an image of the synchronous camera lens module photographing in all directions with a single lens according to the embodiment of the present invention.

Figure 4:
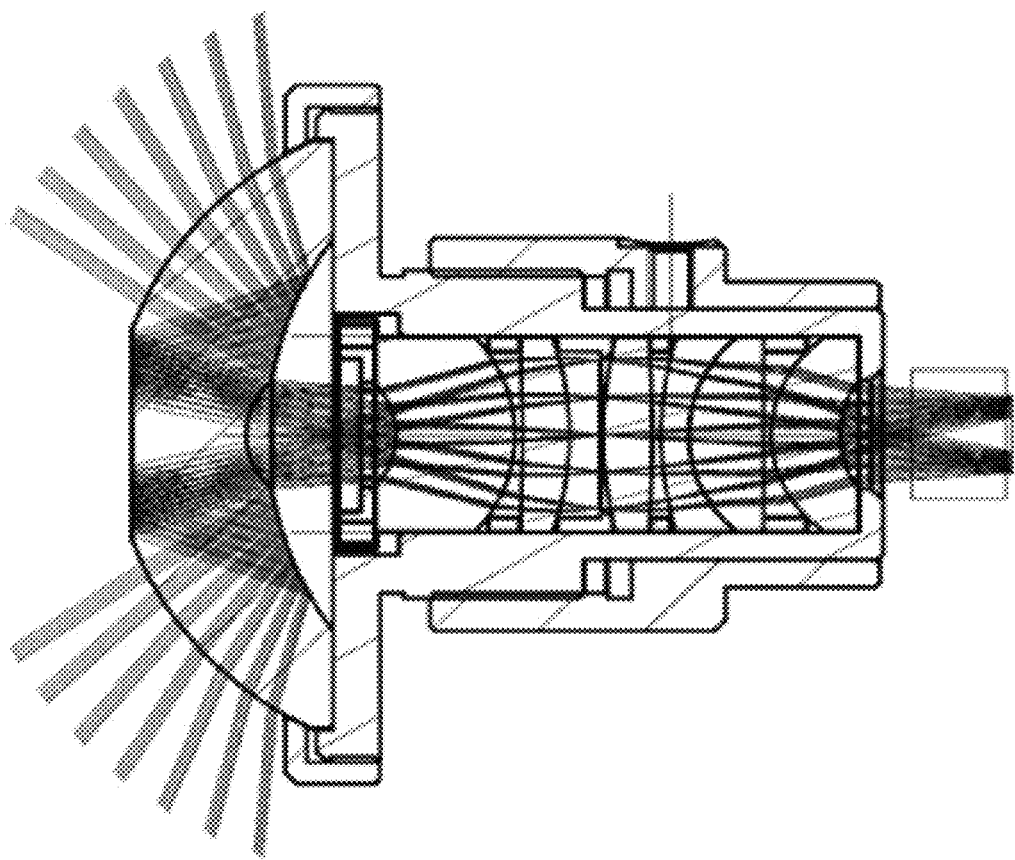
FIG. 4 is a cross-sectional view of the synchronous camera lens module photographing all directions with a single lens according to the embodiment of the present invention.

FIG. 4 is a cross-sectional view of the synchronous camera lens module photographing in all directions with a single lens according to the embodiment of the present invention.

As illustrated in FIG. 3, when the incident light is incident in the lens array by the inner concave of the present invention, the light is collected for the focus.

In the case of a general optical lens, an image is focused according to the amount or reflection of the light, and as a result, a design of an optical system needs to be manufactured as a perfect body.

That is, since reflection of light generated through one overall shape is organic, the optical system is processed as the perfect body from an initial design time.

Such a configuration is simple, but is based on an idea of how to secure a wider range of incident angle.

Further, as illustrated in FIG. 4, the omnidirectional lens is coupled to the front of the barrel and the lens array is configured in the barrel.

Figure 5:
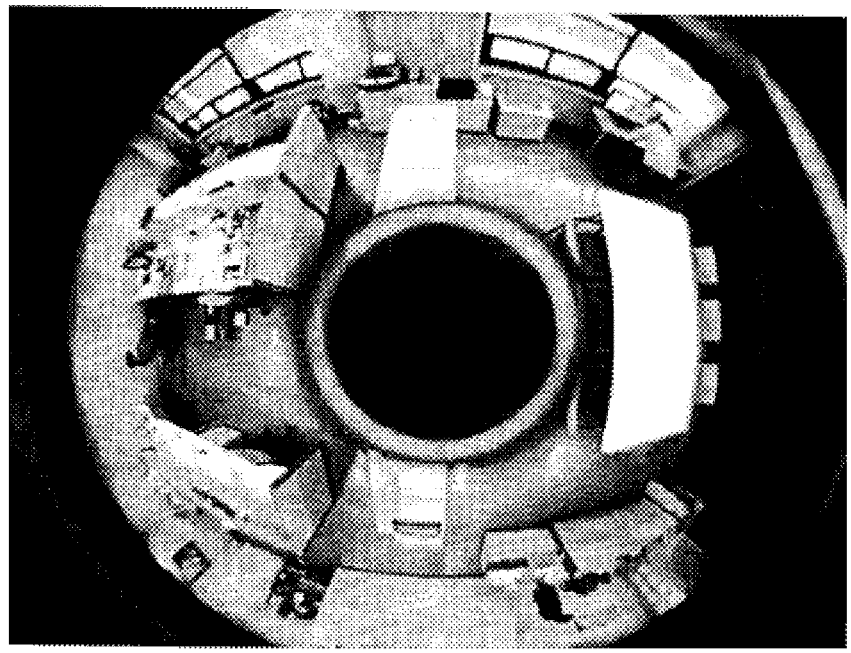
FIG. 5 is a diagram illustrating an example of securing a viewing angle of the synchronous camera lens module photographing all directions with a single lens according to the embodiment of the present invention.

FIG. 5 is a diagram illustrating an example of securing a viewing angle of the synchronous camera lens module photographing all directions with a single lens according to the embodiment of the present invention.

Figure 6:
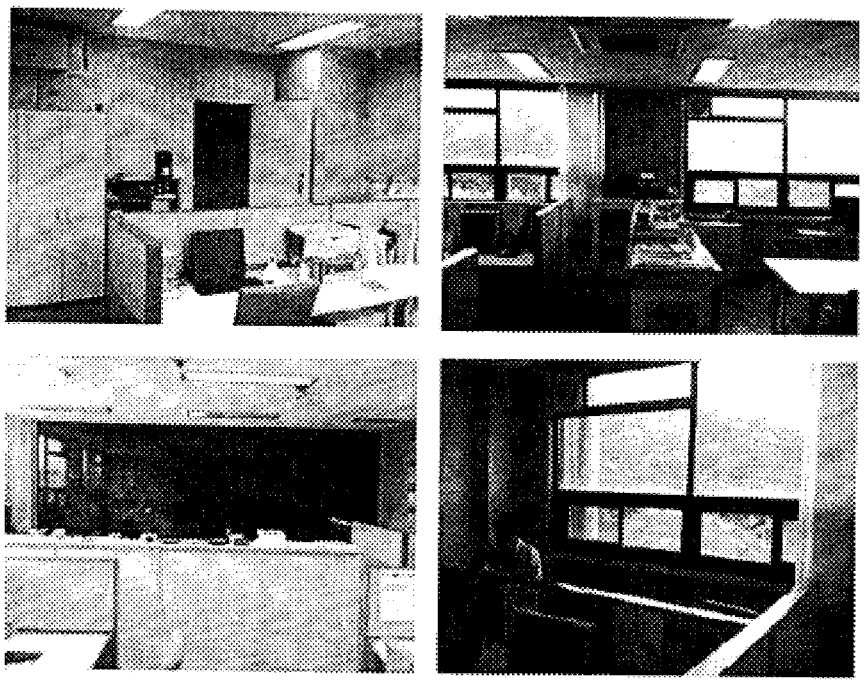
FIG. 6 is an exemplary diagram illustrating image screens of four front, rear, left, and right channels by using the synchronous camera lens module photographing in all directions with a single lens according to the embodiment of the present invention.

FIG. 6 is an exemplary diagram illustrating image screens of four front, rear, left, and right channels by using the synchronous camera lens module photographing all directions with a single lens according to the embodiment of the present invention.

FIG. 5 illustrates an example in which an omnidirectional viewing angle is secured when a conventional general lens module is replaced with the lens module of the present invention and FIG. 6 illustrates an example in which image screens of four front, rear, left, and right channels are output through a terminal As described above, it may be verified that omnidirectional photographing is enabled through the omnidirectional lens of the present invention.

Figure 7:
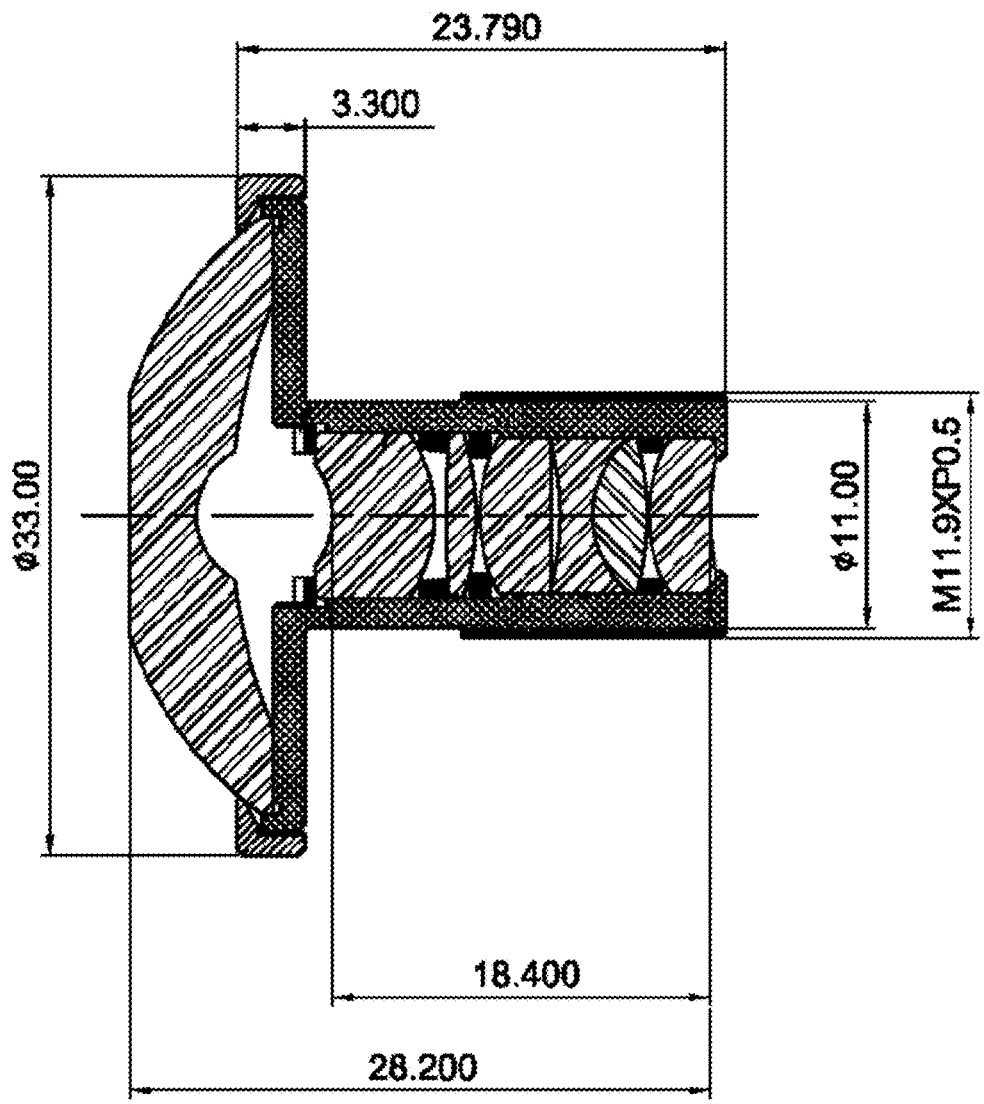
FIG. 7 is an exemplary diagram illustrating diameters of an omnidirectional lens and a lens array of the synchronous camera lens module photographing all directions with a single lens according to the embodiment of the present invention.

FIG. 7 is an exemplary diagram illustrating diameters of an omnidirectional lens and a lens array of the synchronous camera lens module photographing all directions with a single lens according to the embodiment of the present invention.

As illustrated in FIG. 7, diameters of the omnidirectional lens 100 and the lens array 300 are 3:1.

That is, when the diameter of the omnidirectional lens is, for example, approximately Ø33.00, the diameter of the lens array needs to be approximately Ø11.00.

This is to provide an effect to increase a resolution by precisely taking the focus.

Through such a configuration, only a lens module of a conventional monitoring camera is replaced by providing a synchronous camera lens module using a single optical lens capable of performing wide-angle photographing to photograph in all directions with the single lens which is high economically and in efficiency and can minimize a blind zone, and as a result, a weak point of the related art may be solved by acquiring an image for a viewing angle which is not caught by the lens in the related art.

Further, since the lens itself is not aspheric but spherical, processing the lens is easy and a manufacturing process is simple, thereby providing manufacturing convenience and manufacturing cost saving.

Those skilled in the art will be able to understand that the present invention can be easily executed in other detailed forms without changing the technical spirit or an essential feature thereof. Therefore, the aforementioned embodiments are illustrative in all aspects and are not restricted to a limited form.

The scope of the present invention is represented by the claims to be described below rather than the detailed description, and it is to be interpreted that the meaning and scope of the claims and all the changes or modified forms derived from the equivalents thereof come within the scope of the present invention.

INDUSTRIAL APPLICABILITY

According to the present invention, in a synchronous camera lens module photographing all directions with a single lens, the synchronous camera lens module using a single optical lens capable of performing wide-angle photographing is provided to be usefully used in a crime prevention and control field using a camera which may be used by replacing only a lens module of the conventional monitoring camera.

The invention claimed is:

1. A synchronous camera lens module photographing in all directions with a single lens, the lens module comprising:
   a refraction portion formed to refract incident light;
   a horizontal portion formed horizontally to the end of the refraction portion;
   a reflection coating which is formed in the horizontal portion to reflect the incident light reflected from an inner reflection coating and provide the incident light to an inner concave;
   an omnidirectional lens configured to include the inner concave refracting the incident light reflected through the reflection coating again to provide the incident light to a lens array, an inner refraction portion formed on the end of the inner concave to be concave, and an inner reflection coating which is formed in the inner refraction portion to reflect the incident light incident from the refraction portion to the reflection coating; and
   a barrel having the omnidirectional lens installed and configured in front thereof and having the lens array therein.

2. The synchronous camera lens module photographing all directions with a single lens of claim 1, wherein an inclination of the inner refraction portion is larger than that of the refraction portion based on a virtual central axis.

3. The synchronous camera lens module photographing all directions with a single lens of claim 1, wherein the inner concave is formed to take a focus.

4. The synchronous camera lens module photographing in all directions with a single lens of claim 1, wherein the omnidirectional lens is capable of securing a view angle of 360°.

5. The synchronous camera lens module photographing all directions with a single lens of claim 1, wherein diameters of the omnidirectional lens and the lens array are 3:1.

6. The synchronous camera lens module photographing all directions with a single lens of claim 1, wherein the refraction portion, and the inner refraction portion and the inner concave have spherical surfaces.

* * * * *